June 18, 1963 J. V. GRAHAM ETAL 3,094,059
VERTICAL GUN-PUFFING APPARATUS
Original Filed Jan. 21, 1958 5 Sheets-Sheet 3

INVENTORS
JAMES V. GRAHAM
GORDON A. GOODRICH
ROGER B. MILLER.
BY Cameron, Kerkam & Sutton
ATTORNEYS

June 18, 1963    J. V. GRAHAM ETAL    3,094,059
VERTICAL GUN-PUFFING APPARATUS
Original Filed Jan. 21, 1958                    5 Sheets-Sheet 4

INVENTORS
JAMES V. GRAHAM
GORDON A. GOODRICH
ROGER B. MILLER
BY
Cameron, Kerkam & Sutton
ATTORNEYS

INVENTORS
JAMES V. GRAHAM
GORDON A. GOODRICH
ROGER B. MILLER
BY *Cameron, Kerkam & Sutton*
ATTORNEYS 3,094,059
VERTICAL GUN-PUFFING APPARATUS
James V. Graham, Gordon A. Goodrich, and Roger B. Miller, Battle Creek, Mich., assignors to General Foods Corporation, White Plains, N.Y., a corporation of Delaware
Continuation of abandoned application Ser. No. 710,230, Jan 21, 1958. This application Oct. 27, 1959, Ser. No. 849,119
9 Claims. (Cl. 99—238)

This invention relates to cereal puffing apparatus and mor particularly to improved puffing apparatus which is simple and inexpensive and at the same time automatic and substantially continuous in operation and capable of producing a uniformly puffed product of high quality.

The conventional method of puffing cereal grains, dough pellets, and other cereal forms has been to charge the cereal forms or elements into a closed pressure chamber or so-called gun wherein they are subjected to pressure, together with heat and moisture when cooking as well as puffing is desired. Usually steam is admitted to the closed chamber, after which a gate or door is unlatched and blown open practically instantaneously by the pressure in the gun. The cereal elements thereupon explode from the gun into a zone of lower pressure (usually atmospheric) and are puffed. This traditional practice is essentially a batch operation and for large scale production resort has been made to the use of a plurality of guns operating with overlapping cycles of filling, closing, pressurizing and opening or puffing. In an effort to minimize manual labor and also to promote uniformity, U.S. Patent No. 2,598,242 proposes automatic mechanism set into action by the operator after the gun is charged for carrying out the subsequent operations of closing the gun, steaming and pressurizing the charge, and opening the gun to explode the charge.

Apart from the fact that the above procedure has the usual disadvantages of a batch operation, it also produces non-uniform results with respect to the size and other characteristics of the puffed grains, pellets, or other cereal forms (all hereinafter referred to as grains). The grains are very sensitive to the time of their exposure to the high temperature and pressure in the gun, to the amount to drop in pressure which they undergo on opening of the gun, and to the rapidity with which this drop in pressure takes place. These conditions can be controlled with respect to the batch as a whole, but it is difficult if not impossible to avoid substantial variations in the treatment of the individual grains of such a batch and especially in the rapidity of the drop in pressure in the individual grains as they are expelled from the gun. Control of these conditions with respect to individual grains becomes more difficult as the sizes of the gun and the batch are increased, whereas on the other hand a large number of small batches is obviously undesirable for quantity production.

In an effort to minimize these defects, it has been proposed to heat a charge of grain in a pressure container, and then to open a relatively small discharge outlet so that the pressure is retained in the container and forces a mass of grain into the outlet through which the individual grains of the mass are progressively expelled; see for example Ferguson Patent No. 1,839,917. In this method, however, the time of exposure of the individual grains to the high temperature and pressure in the container varies substantially because of the time required to expel the entire charge through the restricted outlet, and as a consequence the puffed grains vary not only in size but also in degree of cooking. Moreover, forcing the mass of grain into and through the outlet tends to cause clogging of the outlet with resulting physical distortion and mechanical damage to many of the grains, and with the further result that some grains are held up in passing through the outlet so that the pressure drop therein takes place gradually. Another expedient proposed to combat the same problem is the use of an auxiliary steam chamber at the end of the gun opposite the gate through which the charge is expelled, as disclosed in Warren Patent No. 2,261,456. This expedient avoids the difficulty of jamming of the cereal elements in a restricted orifice, but does not produce the desired results as to uniformity of pressure drop in the individual grains.

The prior practices described above are all essentially batch processes. A truly continuous process is disclosed in U.S. Patent No. 2,622,985, and this process solves the difficulty of non-uniformity and avoids physical distortion of the cereal elements, but is not feasible for use under all conditions and with all types of cereal forms.

One of the objects of the present invention is to provide novel means for accomplishing substantially the results of the aforesaid prior Patent No. 2,622,985, as to quality of the product obtained, which means although not truly continuous, is fully automatic in operation like the process of said prior patent but utilizes simpler and less expensive equipment and is applicable generally to gun-puffing operations heretofore practiced.

Another object is to provide novel means as characterized in the preceding object which, while not truly continuous as in Patent No. 2,622,985, nevertheless operates automatically and without any manual intervention to repeat its cycle and thus to discharge a steady, uninterrupted succession of puffed batches at regular timed intervals.

Still another object is to eliminate the use of restricted orifices and yet to provide a less sudden drop of pressure in the gun than takes place with latch-controlled pressure-operated gates of the usual type, with the result of promoting uniformity of puffing throughout an entire batch.

The above objects and others will appear more fully hereinafter as the description proceeds.

In apparatus embodying the invention, it is preferable to employ a preheating stage prior to the pressurizing stage, since preheating can be accomplished readily in warm air or the like at atmospheric pressure, and the size of the equipment required to be capable of withstanding pressure is greatly reduced for a given volume of production. Also it appears that preheating in warm air before pressurizing with steam, and/or the tempering effect incident to such preheating, contributes to the high yield and quality of the puffed product. But since preheating in warm air is apt to require more time than the subsequent steaming time for the preheated charge, it may be desired to employ two alternately discharged preheating chambers with each pressurizing chamber.

The accomplishment of the objectives of the invention is further facilitated if the preheated charge passes from the preheating apparatus through the pressurizing chamber and to the final collection or storage point in a straight, vertical, downward path. The vertically downward direction of movement of the charge makes it possible to move the charge by gravity, with elimination of moving conveyor-type equipment, and also makes it possible to move the charge from one zone to another not only automatically but also very rapidly. This is advantageous in the interest of maximum utilization of equipment, conservation of preheat and moisture in the grains, and avoidance of losses incident to transfer of the charge from one point to another by conventional conveying means.

It will be seen also that instead of a "gun" which is filled through a gate or door at one point or end and which explosively opens the gate and discharges through it practically instantaneously, the uni-directional movement of the charge in the present invention requires a vertical approximately tubular puffing chamber arranged for the straight-through passage of the preheated charge, the pressure zone being defined by an inlet valve at one end and an outlet valve at the other. For automatic operation in timed sequence, moreover, these valves must be power-operated instead of being merely unlatched to be blown open by the explosive force of the steam pressure. It has been found that this arrangement has the added and unexpected advantage of contributing materially to uniformity of puffing. This may be due in part to the fact that the opening of the discharge valve, while rapid, still takes place gradually as compared with the instantaneous explosion of the conventional gun, and thus exerts a measure of control of the pressure drop; yet it opens rapidly enough and far enough to avoid the adverse physical effects of throttling mentioned above. On the other hand, the vertical pressure chamber and its bottom discharge permit the whole charge to pass rapidly out of the gun with a minimum of danger that some parts of the charge may be retarded materially relative to the remainder with possible resulting localized overcooking and non-uniform puffing effects.

It will be seen that the automatic operation of a system of the type discussed requires timed control and mechanical operation of a plurality of valve means for the preheater, for effecting the movement of the charge from the preheater to the pressurizing chamber and the opening and closing of the inlet and outlet of the chamber, and for supplying pressurizing fluid such as steam to the chamber. Various types of timed valve control systems are known which are actuated electrically, hydraulically, and/or pneumatically, and any such system is within the broad purview of the invention. It is preferred, however, to employ pneumatic valve actuators, the air supply being regulated by pneumatic pilot valves operated by a suitable timer device as described hereinafter.

One embodiment of the invention has been illustrated in the accompanying drawings but it is to be understood that said drawings are for purposes of illustration only and are not to be construed as a definition of the limits of the invention, reference being had to the appended claims for this purpose.

In said drawings.

Figures 6, 7:
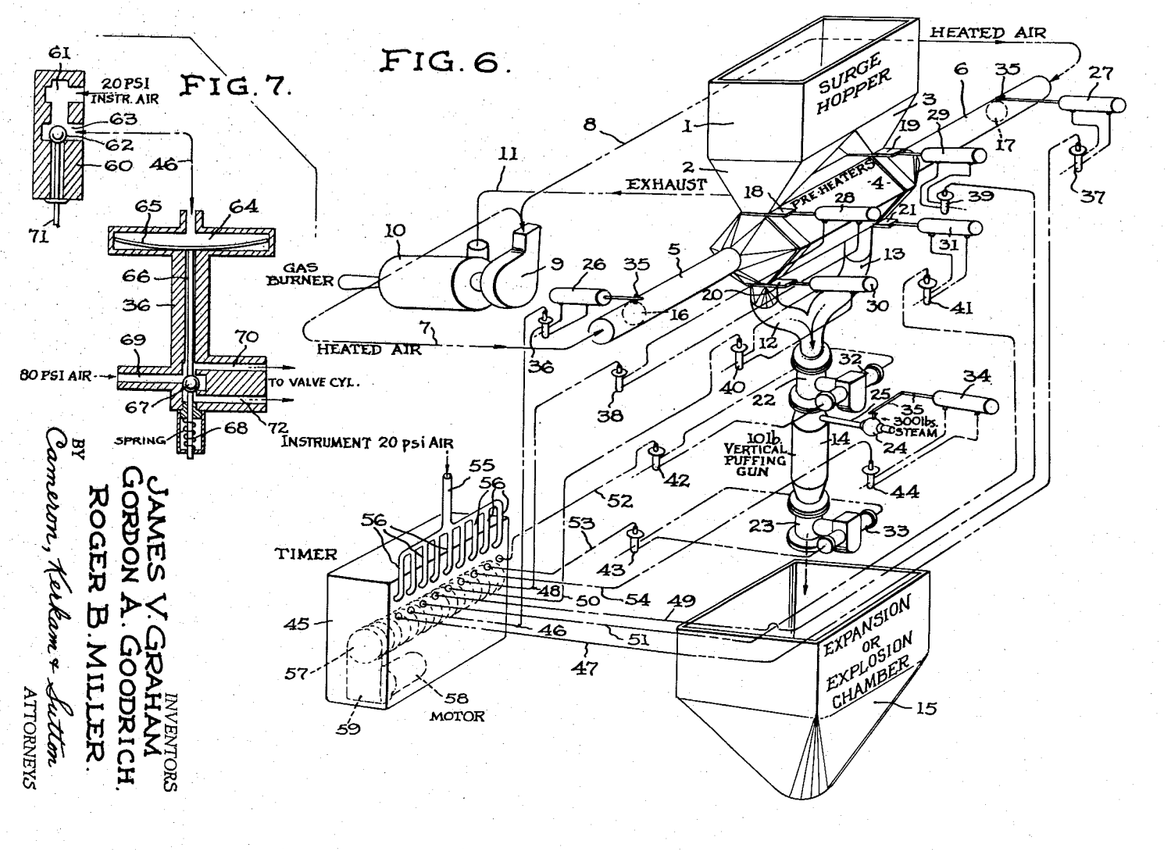
FIG. 6 is a diagrammatic view illustrating the control system employed for the automatic operation of the apparatus.
FIG. 7 is a detail of certain elements employed in the control system.

It will be convenient first to describe the system as a whole with particular reference to diagrammatic FIG. 6, before going into detail as to the specific structure of the units of the system. The main elements of the system are indicated generally in FIG. 1 and comprise at the top a main feed hopper 1 having a pair of tapering bottom outlets or downspouts 2 and 3 for delivery of material into the opposite ends of a double-ended preheater unit 4. Warm air is supplied to the two ends of the preheater unit through conduits 5 and 6 which are in turn supplied by pipe lines 7 and 8 (shown in dot and dash lines in FIG. 6) leading to a common source such as a suitable blower 9. The blower in turn is supplied with warm air by a suitable heating chamber 10 and the exhaust from the preheater 4 is returned to this heating chamber through a line 11 (also indicated in dot and dash lines in FIG. 6).

The preheater 4, here shown as a double unit, is provided with twin bottom discharge conduits or downspouts 12, 13 which merge and deliver the preheated charge into the upper end of a pressurizing chamber unit indicated as a whole by the numeral 14. The puffed cereal charge is discharged from the unit 14 into any suitable receiver 15.

The system described generally above is operated automatically by nine power-operated valves which for convenience are numbered consecutively as follows:

Two warm air inlet valves 16 and 17 in the warm air conduits 5, 6 to the preheater 4, these valves as shown being of the butterfly type; two preheater inlet valves 18, 19, preferably simple slide valves, one between each preheating chamber and the respective downspout 2 or 3 of the hopper 1; two preheater outlet valves 20, 21, preferably simple slide valves, one between each preheating chamber and the respective discharge conduit or downspout 12 or 13 leading to the pressurizing unit 14; an inlet valve at the top of the pressurizing unit 14 which is indicated generally at 22; a discharge valve at the bottom of the pressurizing unit which is indicated generally at 23; and finally a steam control valve 24 in the steam supply line 25.

The preheater 4 is shown as being of the double chamber type for reasons stated above. It will be understood that if only a single preheating chamber is desired, then one of the air control valves 16 or 17, one of the slide valves 18 or 19, and one of the slide valves 20 or 21 would be unnecessary. In the case of a single preheating chamber, moreover, both slide valves 20 and 21 could be omitted in some cases since the inlet valve 22 of the pressurizing unit would be sufficient.

Each of the nine valves is operated automatically by a suitable pneumatic cylinder and piston, there being accordingly nine double-acting cylinders numbered 26–34 to correspond with the line valves 16–24. These nine cylinders are indicated diagrammatically in FIG. 6. In the case of the reciprocating slide valves such as 18, 19, they may be connected directly with the valve elements. Where necessary, on the other hand, cylinders are connected to valves through suitable linkages, as in the case of the steam supply valve 24 which is connected with its operating cylinder 34 by means of the operating arm 35. Similar operating arms 35 are provided for the butterfly valves 16 and 17.

Each cylinder is double acting, having a fluid pressure line from each end to a suitable associated pilot valve, the nine pilot valves being numbered 36–44 and corresponding respectively with the nine valves 16–24 and cylinders 26–34. The pilot valves control the admission of fluid pressure to one or the other end of their respective cylinders according to the position of the valve element described hereinafter. The position of this valve element is in turn regulated by a connection from each pilot valve to a timer control unit 45, the nine individual connections being numbered 46–54. A common low pressure air supply line 55 is branched at 56 and the nine branches supply low pressure air to nine pilot valve control units located in the top of the timer control box. These control units are actuated by cam-like devices 57 arranged in a row on a common shaft and indicated in dotted lines in FIG. 6, the shaft being driven by a motor 58 and suitable gearing housed in the gear box 59.

FIG. 7 shows a suitable type of pilot valve control unit 60 in association with a suitable pilot valve, for example, the pilot valve 36 which controls the cylinder 26 and the air supply valve 16. The low pressure air from one of the branches 56 of the supply line 55 is admitted to the chamber 61 at the top of the control unit 60 and when the ball valve 62 is open as shown in FIG. 7, this low pressure air passes out through the passage 63 and through the line 46 to the top of the pilot valve 36, where it enters a diaphragm chamber 64 and depresses a diaphragm 65. The diaphragm stem 66 carries a ball valve 67 and is normally urged upwardly against the air pressure by a suitable spring 68. With the ball valve 67 in its down position as shown, high pressure air enters the pilot valve casing through a passage 69 and leaves the valve casing through passage 70 connected to the appropriate end of the cylinder 26. As the time control shaft rotates, the appropriate cam-like element 57 thereon eventually engages the bottom projecting end 71 of the ball valve 62 in the control unit and lifts this valve to its upper position, thus shutting off the supply of low pressure air to the diaphragm chamber 64. As long as the control unit valve 62 remains in this raised position, the spring 68 is effective to hold the ball valve 67 of the pilot valve in its upper position so that the high pressure air coming from the inlet passage 69 leaves the valve casing through a passage 72 leading to the opposite end of the cylinder 26. Thus the operation of the cylinder is reversed to shift the position of the valve 16, which is held in shifted position until the ball valve 62 of the control unit drops to its lowermost position and the diaphragm 65 is again depressed as described above.

The operating cycle of the system can be described most conveniently with reference to FIGS. 6 and 7. Assume as a starting point the condition existing just prior to the discharge of a cereal charge from the pressurizing unit 5. Both preheater chambers will be in use, the slide or gate valves 18, 19, 20 and 21 all being closed and the warm air valves 16 and 17 being open. Inlet and outlet valves 22, 23 of the pressurizing unit will both be closed and the steam supply valve 24 will be open.

When the pressurizing and/or cooking interval is completed, or prior thereto when sufficient steam is supplied, valve 24 closes through operation of its pilot valve 44 and reversal of the pistol in the cylinder 34 as described above. Valve 53 then opens and the cereal charge is puffed and discharged into the receiver 15.

Outlet valve 23 then closes, and inlet valve 22 and one of the slide valves 20, 21, say 20, open to permit the preheated charge in one of the preheating chambers to drop by gravity into the pressurizing device 14. At the same time one of the warm air valves 16, 17 closes, in this case the valve 16.

As soon as the fresh charge has passed into the pressurizing device, its inlet valve 22 closes and the steam valve 24 opens for the pressurizing and/or cooking cycle. Then in order to refill the preheating chamber, the slide valve 20 closes and the slide valve 18 opens so that a fresh charge passes down the spout 2 into the preheating chamber. After this has been accomplished, slide valve 18 closes again and warm air valve 16 opens to begin another preheating operation, all of the parts being now back in the condition assumed as a starting point. This cycle continues to repeat automatically except that the two preheating chambers are discharged alternately, the time provided for preheating being thus twice that provided for the pressurizing and/or cooking cycle.

Figure 3:
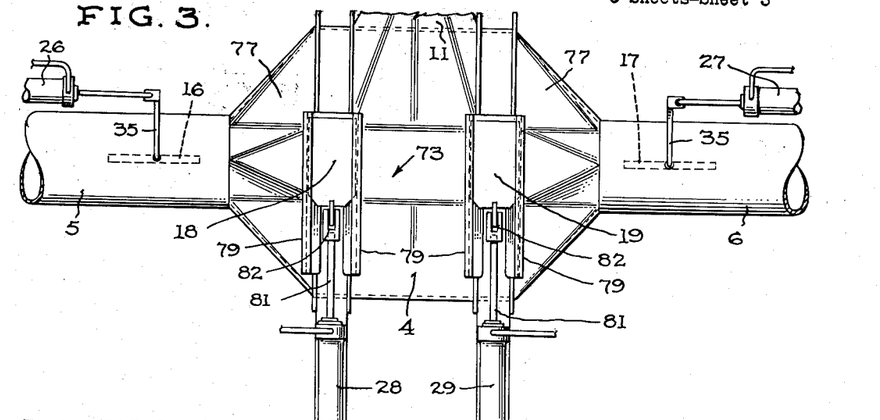
FIGS. 3, 4 and 5 are respectively top, front and end views of the preheating apparatus which forms part of FIGS. 1 and 2.
Figure 4:
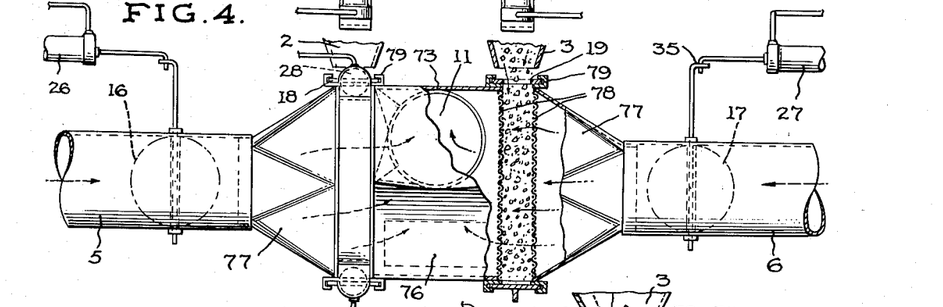
Figure 5:
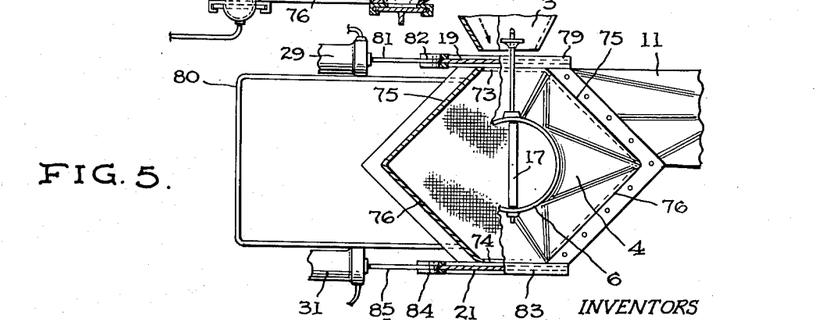

FIGS. 3, 4 and 5 show the details of a preferred form of the double preheater which is indicated generally at 4 in FIG. 6. The casing of the preheater is generally hexagonal in cross-section but not a regular hexagon for reasons that will appear later, and is disposed on a horizontal axis. It comprises top and bottom horizontal walls 73, 74, an upper pair of outwardly diverging walls 75, and a lower pair of inwardly converging walls 76. The ends of the casing are suitably tapered down to and merged with conduits 5 and 6 mentioned above, as shown at 77.

At each end of the preheater, a preheating zone is formed by a pair of substantially vertical parallel partitions which define a preheating zone between them and are perforated for the passage of preheating air from conduits 5 and 6 through the zones. As indicated particularly in FIG. 4, these vertical partitions may comprise screens 78 extending across the casing of the preheating unit in spaced relation. The central part of the preheater unit between the two preheating zones forms an exhaust chamber to which the exhaust conduit 11 is connected.

The space between the screens 78 of each pair is left open at the top and bottom of the casing for the width of the top and bottom walls 73, 74 so as to provide inlet and discharge openings for the cereal charge to be puffed, these openings being controlled by the slide valves 18, 19, 20 and 21 described above. As shown in FIGS. 4 and 5, the downspouts 2 and 3 from the hopper 1 preferably terminate in ends that conform in size and shape to the inlet openings at the top of the two preheating zones. The slide valves 18 and 19 which control the inlet of the cereal elements to these zones may suitably comprise simple sliding plates 18 and 19 which slide horizontally in retaining guideways 79 mounted in any suitable manner on the top wall 73 of the preheater casing. These slides 18 and 19 are operated by the cylinders 28 and 29 mentioned above, the cylinders being suitably mounted in front of the casing on frames 80 which may be used to support the preheater unit as described hereinafter. The piston rods 81 of the cylinders 28 and 29 can be connected to their respective slides 18 and 19 in any suitable manner, as by means of coupling devices 82 of any suitable type. Preferably the discharge valves 20 and 21 also comprise sliding plates similar to the valve plates 18 and 19 and are slidable in retaining guideways 83 mounted on the bottom wall 74, the valve plates being connected by suitable couplings 84 with the piston rods 85 of the operating cylinders 30, 31 which may also be mounted on the frames 80 mentioned above.

As shown more particularly in FIG. 5, the bottom walls 76 of the preheating zone are inclined downwardly and inwardly to the edges of the discharge opening at the bottom of each zone. Preferably the angle that these inclined walls make with the horizontal is greater than the angle of repose of the preheated cereal elements, so that although the greatest width of the zones is much more than that of the discharge openings to provide greater capacity, yet when a bottom discharge valve 20 or 21 is opened the preheated charge passes out of the preheater substantially without sticking. Thus the preheated charge is dumped rapidly from either preheating zone into the respective downspout 12 or 13 practically instantaneously when a discharge valve 20 or 21 is opened.

Figure 1:
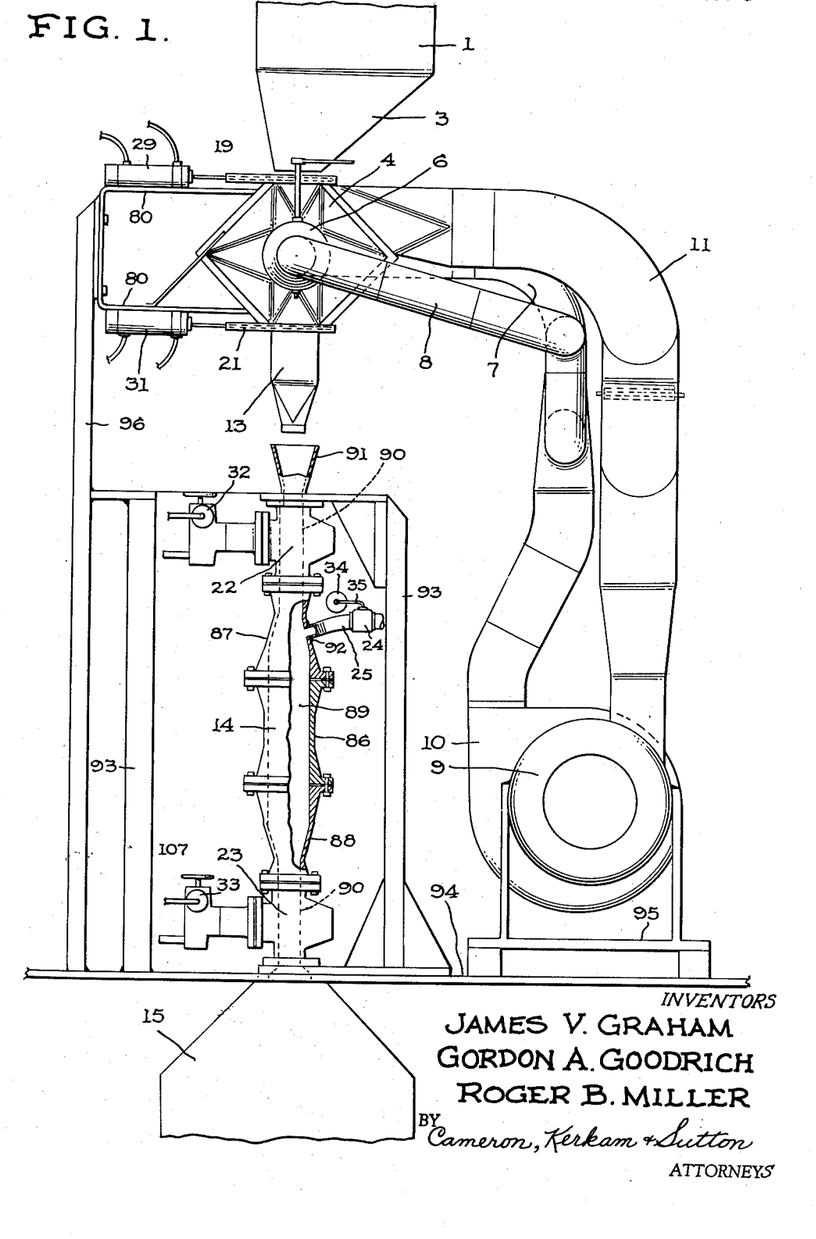
FIG. 1 is an elevation, partly in section, of apparatus embodying the invention.
Figure 2:
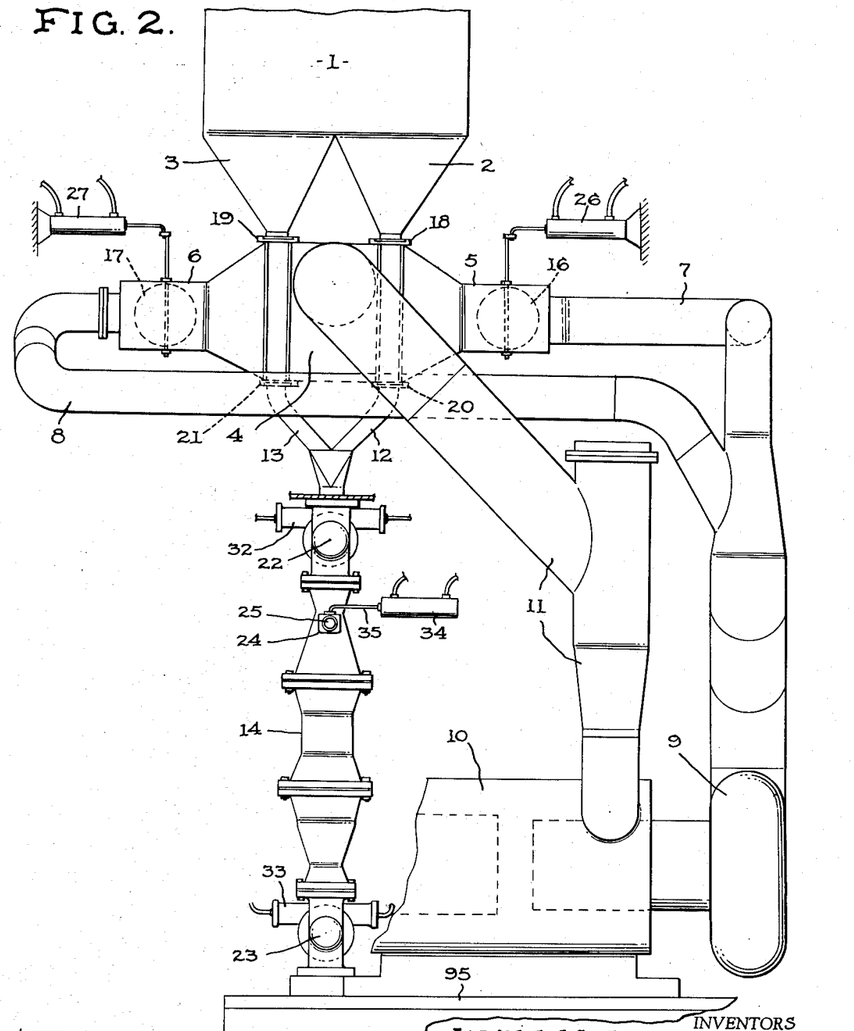
FIG. 2 is an elevation of the apparatus of FIG. 1, taken at right angles to FIG. 1.

The details of a suitable pressurizing or puffing unit 14 are shown in FIGS. 1 and 2. It comprises a central section 86 having a flanged connection at its upper end to an end section 87 and at its lower end to a similar end section 88. These sections provide a substantially tubular vertical puffing chamber 89 of approximately uniform diameter throughout its length except for some restriction at the ends of the sections 87 and 88 where they are connected to the valve casings 22 and 23 respectively. As indicated in dotted lines in FIG. 1, the passages 90 through each of the valve units 22 and 23 are thus almost equal in diameter to the tubular puffing chamber 89 so that there is little or no tendency to restrict the free flow by gravity of the cereal charge into, through, and out of the device. This desired result of course further requires the use of valves of a type which move to wide open positions in which the valve openings are of substantially the same diameter as the passages 90.

The preheated cereal charge coming from the downspout 12 or 13 can be conducted into the upper end of the pressurizing unit 14 in any desired manner. As stated above, the downspouts 12 and 13 preferably merge and as shown in FIG. 1, the merged lower end of these downspouts is disposed above a hopper 91 through which the charge passes into the passage 90 of the valve casing 22. The pressurizing fluid such as steam can be admitted to the chamber 89 in any desired manner and as shown the supply pipe 25 referred to above is coupled to an inlet nipple 92 on one side of the upper casing section 87 of the pressurizing device.

Any suitable means may be employed for mounting the apparatus discussed above in the desired superposed positions. As shown in FIG. 1, for example, the pressurizing device 86, 87, 88 is mounted in framework comprising standards 93 rising from the floor 94. This floor also supports the base 95 of the blower 9 and heating chamber 10. Additional standards 96 rise from the floor to a point above the pressurizing device, where they are connected to the frames 80 mentioned above which are suitably connected to and support the preheater unit.

Figure 8:
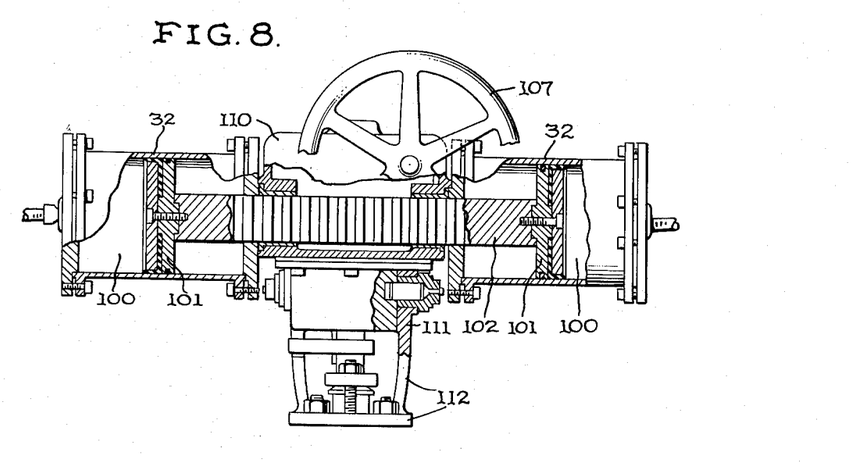
FIGS. 8 and 9 are sectional views taken at right angles and showing one suitable type of control valve for the pressurizing or puffing chambers.
Figure 9:
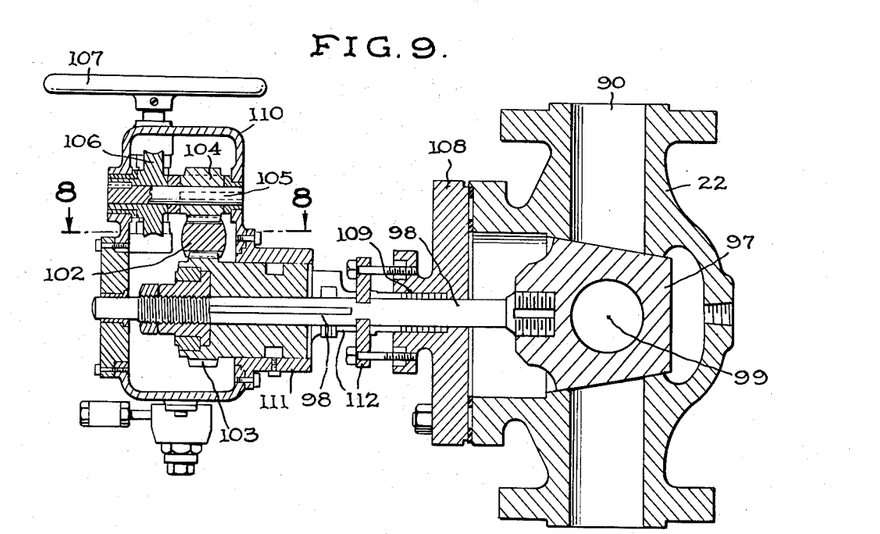

As already stated, the inlet and outlet valves 22 and 23 of the pressurizing device must be power operated and are preferably such as to be moved progressively and rapidly from fully closed position to the fully open position described above by a single stroke of their respective operating pistons. Subject to these requirements, however, any desired type of valve can be employed such as known gate and plug-type valves. FIGS. 8 and 9 show by way of example a known type of plug valve that has given good results. The valve casing 22 (or 23) is traversed by the straight passage 90 mentioned above, which is closed by a tapered plug 97 seated in the casing and rotatable by means of a stem 98. The plug has a bore 99 adapted to align with the passage 90 when the plug is rotated and having substantially the same diameter as the passage 90.

The valve plug is rotated by a suitable double-acting pneumatic cylinder as diagrammatically indicated at 32 in FIG. 6. As shown more particularly in FIGS. 7 and 8, this cylinder may be divided into two chambers 100 each containing a piston 101, the two pistons being connected by a rod 102 so that they operate as a unit. When the piston assembly 101, 102 moves in either direction, rack teeth formed on one side of the rod 102 mesh with the teeth of a gear 103 carried by the stem 98 of the valve plug 97. Thus the movement of the piston assembly 101, 102 in one direction rotates the valve plug 97 to open position, and the movement of the piston assembly in the opposite direction returns the valve plug 97 to closed position.

If desired, provision can also be made for manual operation of the valve plug 97 in case of need. For example, the rod 102 may also be provided with teeth on another side which mesh with a pinion 104 on a stub shaft 105 that carries a worm wheel 106 driven by a hand wheel 107 in any suitable manner. Other structural details of this valve are typical and need not be described in detail. The casing 22 is closed by a bonnet 108 and packing gland 109. The cylinders and operating mechanism are carried by a secondary casing 110, 111, the casing part 111 having suitable bracket extensions 112, etc., whereby it is mounted on the valve bonnet 108. The casing 110, 111 is suitably arranged to provide the necessary bearings for the ends of the valve stem 98 and stub shaft 105 and for the reciprocating rod 102; and to carry the operating cylinder sections. These details are known and are not part of the invention, and hence will not be further described.

The operation of the system has already been described with reference to FIGS. 6 and 7. The timing of the various operations will of course vary according to the purpose for which the apparatus is used and can be regulated as desired by means of the cam-like devices 57 which operate the control units 60. In a typical operation, the preheating time required may be 60 seconds, and the pressurizing and discharge time only 20 seconds. With the double preheater described above, a puffed charge can be delivered to the collector 15 every 30 seconds in automatic succession. All that is necessary is to keep the hopper 1 properly supplied.

This is a continuation of U.S. application Serial No. 710,230 filed January 21, 1958, now abandoned for Vertical Gun-Puffing Apparatus.

What is claimed is:

1. Cereal puffing apparatus comprising preheating means, a pressurizing chamber means beneath said preheating means, said two means being arranged to provide a substantially vertical path of movement for the cereal charge from said preheating means into the top and out of the bottom of said chamber, said pressurizing chamber having a substantially uniformly cross-sectioned passage throughout its entire length, valve means controlling the passage of the charge from said preheating means into said chamber including an inlet valve closing the top of said chamber, discharge valve means abutting the bottom of said chamber and having a passage therethrough which is in communication with and has substantial cross-section area relative to that portion of the pressurized chamber immediately adjacent thereto, said discharge valve means comprising an obturating valve in said passage and movable between an obturating position and an open position in which said passage is unrestricted, whereby a cereal charge will be discharged from said chamber with a non-throttling action, power-operated actuating means for each of said valve means, and timed power-control means for said actuating means for operating said first valve means to pass the charge by gravity into said chamber and close said inlet valve, and then operating said discharge valve means to cause the charge to escape from the bottom of said chamber.

2. Cereal puffing apparatus as defined in claim 1, including a pressurizing fluid supply line connected with said chamber, and a control valve in said line having power-operated actuating means controlled by said power-control means for admitting pressurizing fluid to said chamber in the interval between the successive operation of said two valve means.

3. Cereal puffing apparatus as defined in claim 2, said preheating means having a warm air supply line, and a control valve in said warm air supply line having power-operated actuating means controlled by said power-control means for shutting off the supply of warm air to said preheating means when first valve means is operated to pass the cereal charge into said chamber.

4. Cereal puffing apparatus as defined in claim 3, said power-operated actuating means comprising a plurality of pneumatic cylinders one for each valve to be operated, said power-control means comprising a plurality of pilot valves operated in timed sequence, each of said pilot valves controlling the pneumatic fluid supply to one of said pneumatic cylinders.

5. Cereal puffing apparatus comprising preheating means having alternately dischargeable units and a pressurizing chamber means located beneath said preheating means, said two means being arranged to provide a substantially vertical path of movement for the cereal charge from said preheating means into the top of and out the bottom of said chamber, said pressurizing chamber having a substantially uniformly cross-sectioned passage throughout its entire length, a first alternately operable valve means for discharging first one and then the other of said preheating units in alternation, a second inlet valve means at the top of said pressurizing chamber and a third discharge valve means abutting the bottom of said pressurizing chamber and having a passage therethrough which is in communication with and has substantial cross-section area relative to that portion of the pressurized chamber immediately adjacent thereto, said discharge valve means comprising an obturating valve in said passage and movable between an obturating position and an open position in which said passage is unrestricted, whereby a cereal charge will be discharged from said chamber with a non-throttling action, and timed valve-operating means for operating said three valve means in timed sequence to open said first and second valve means and discharge the cereal charge by gravity from said preheating means into said pressurizing chamber, then to close said second valve means and hold the cereal charge in said pressurizing chamber, and then to open said third valve means and discharge the puffed cereal charge from said chamber.

6. Cereal puffing apparatus as defined in claim 5, including a pressurizing fluid supply line connected to said chamber, and a fourth valve controlling said supply line and operated by said valve-operating means to open said supply line during the interval between closing said second valve means and opening said third valve means.

7. Cereal puffing apparatus as defined in claim 6, said chamber being approximately tubular and said discharge valve means being movable between closed position and an open position in which the diameter of the open valve passage is at least a major fraction of the diameter of the chamber.

8. Cereal puffing apparatus as defined in claim 7, said valve-opening means comprising a power-actuated piston connected with said discharge valve means and moving the discharge valve from closed position to fully open position on a single stroke of said piston.

9. Cereal puffing apparatus as defined in claim 5, said preheating means comprising spaced, substantially parallel and vertical walls defining a preheating zone between them, said walls being perforated for the passage of preheating gas through said zone, the space between said walls at the bottom of said zone being open to provide a discharge opening normally closed by said first valve means, and bottom walls extending between said vertical walls on both sides of said opening, said bottom being inclined downwardly toward said opening at an angle to the horizontal that is greater than the angle of repose of the preheated cereal elements.

References Cited in the file of this patent

UNITED STATES PATENTS

| | | |
|---|---|---|
| 955,606 | Moreau | Apr. 19, 1910 |
| 960,857 | Eggert | June 7, 1910 |
| 1,655,618 | Mason | Jan. 10, 1928 |
| 1,707,930 | Bennett | Apr. 2, 1929 |
| 1,824,221 | Mason | Sept. 22, 1931 |
| 1,839,917 | Ferguson | Jan. 5, 1932 |
| 2,261,456 | Warren | Nov. 4, 1941 |
| 2,414,185 | Andrews | Jan. 14, 1947 |
| 2,622,985 | Haughey et al. | Dec. 23, 1952 |
| 2,627,221 | Doyle | Feb. 3, 1953 |
| 2,698,799 | Rupp et al. | Jan. 4, 1955 |
| 2,766,120 | Reinhart | Oct. 9, 1956 |
| 2,838,401 | Gates | June 10, 1958 |